Oct. 2, 1962
E. J. MOONEY
3,056,575
SAFETY VALVE
Filed March 30, 1959
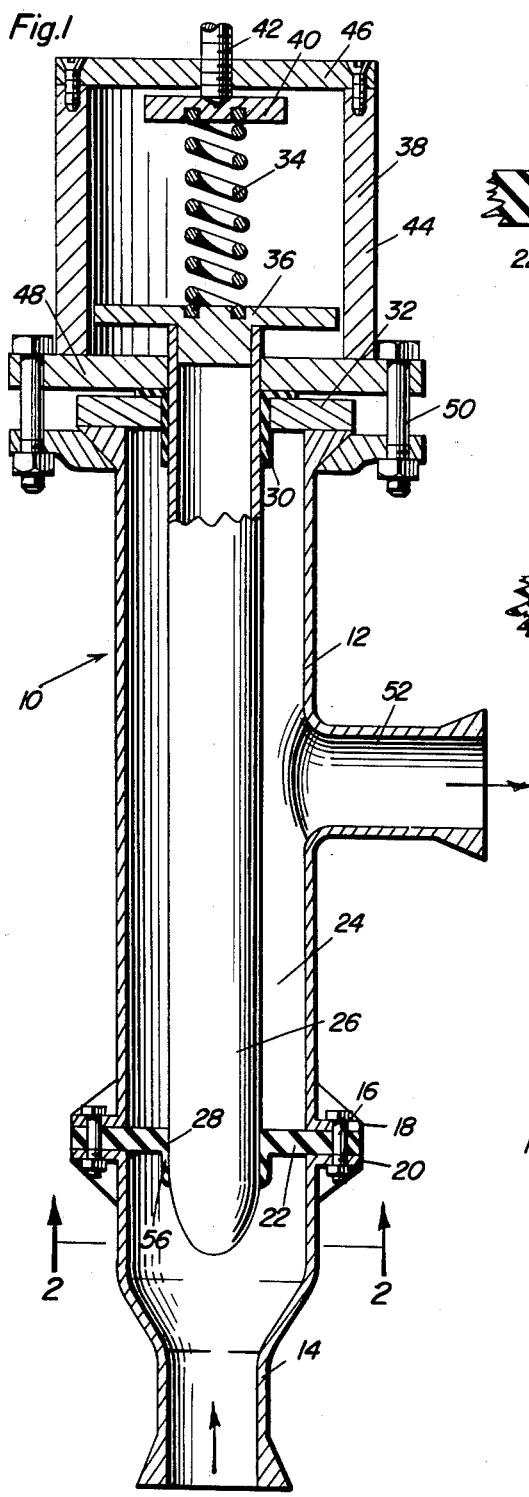
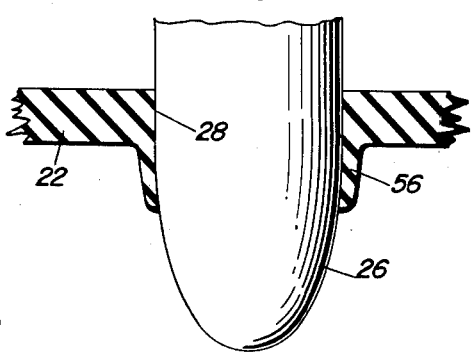
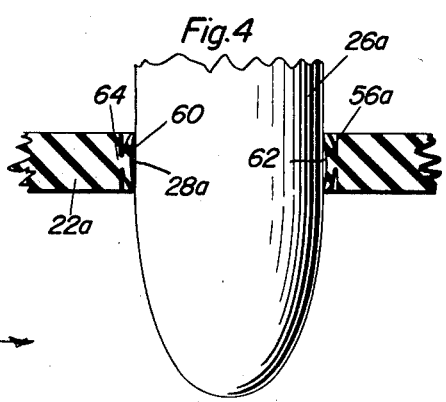
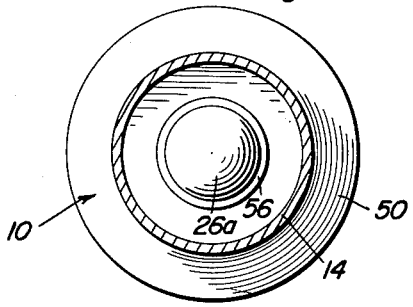
Edmund J. Mooney
INVENTOR.
BY Clarence A. O'Brien
and Harvey B. Jacobson
Attorneys United States Patent Office 3,056,575
Patented Oct. 2, 1962

3,056,575
SAFETY VALVE
Edmund J. Mooney, 341 Washington Ave.,
West Englewood, N.J.
Filed Mar. 30, 1959, Ser. No. 802,964
2 Claims. (Cl. 251—172)

This invention relates to safety and relief valves, and the principles of the invention are applicable equally as well for valves which control the flow of fluids, either liquid or gaseous, and valves which are designed to operate on vacuum or pressure changes.

Valves of this type are normally of the direct spring-loaded arrangement where the spring load produces a valve element-to-valve seat sealing pressure. The standard design is such that as pressure builds up, considering that the valve is pressure responsive, on the inlet side of the valve this sealing pressure from the spring is put into equilibrium, and the sealing effect of the valve is very poor when this balance of pressure between the fluid controlled by the valve and the spring is below the proper pressure load for an effective seal.

Accordingly, an object of the invention is to provide an improved valve seat which eliminates this difficulty by failing to reduce the seating pressure of the valve element and seat contact. In fact, the seating pressure is increased up to the point of relief which, as stated aforesaid, is ordinarily applied by spring load and adjustable.

A further object of the invention is to provide a valve seat design which seals equally as well when fluids in the gaseous or liquid state are controlled by the valve.

The objects of the invention are achieved by the seat design which includes a lip which projects from one face of the valve seat and which is exposed to inlet pressure (or vacuum) to deform in a direction at which the lip firmly contacts the valve element, this being especially useful under the critical operating conditions of the valve where conventional valves go into equilibrium as described previously. As an equally important alternative, the lip design may be made such that any effective seal is provided on both sides of the valve seat so that both suction and pressure are accounted for in the functioning of the valve.

Other objects and advantages of this invention will become apparent in following the description of the illustrated forms of the invention.

In the drawing:

FIGURE 1 is a longitudinal sectional view of a typical valve embodying the principles of the invention.

FIGURE 2 is a cross-sectional view taken on the line 2—2 of FIGURE 1.

FIGURE 3 is an enlarged fragmentary sectional view showing principally the lift construction of the valve seat.

FIGURE 4 is an enlarged fragmentary sectional view showing a modification of the lip construction of the valve seat.

In the accompanying drawings there is shown valve 10 which diagrammatically represents any type of safety and relief valve which operates to control the flow of fluid i.e. liquid or gaseous. Valve 10 has a valve body 12 with an inlet reducer 14 attached to one end thereof by bolts 16 extending through apertures in parallel flanges 18 and 20 on the valve body 12 and reducer inlet 14 respectively. Valve seat 22 is in the form of a disk of flexible substance, for example rubber or a proper plastic material. Valve seat 22 has its edges disposed between flanges 18 and 20 and is held transversely across valve chamber 24 in this way. The valve seat embodies the principal features of the invention in cooperating with the valve element 26.

Valve element 26 is in the form of an elongate core which extends through opening 28 in valve seat 22. The valve element 26 has one end extended through seal and guide bushing 30, and this extends through an opening and transverse wall 32 at one end of the valve chamber 24. Spring 34 has one end seated on spring seat 36 that is attached to element 26 and located in spring case 38. The other end of spring 34 is mounted on a movable plate 40 that has a setscrew 42 in engagement therewith to adjust the compression of spring 34 and thereby adjust the setting of the valve. Case 38 has a side wall 44 and an end wall 46 connected thereto, together with a lower wall 48 that is held fastened to the valve body 12 by means of a clamp 50. Valve outlet 52 is connected with valve chamber 24 between valve seat 22 and valve chamber wall 32. The valve element, body, spring case, spring and setscrew together with clamp 50 are each conventional. The improvement in the valve is found in the association of valve seat 22 and valve element 26. There are means connected between the valve seat and the valve element for preventing the equilibrium condition from destroying the seal between the valve seat formed by the walls of opening 28 and valve element 26. These means consist of a thin walled lip 56 extending at essentially right angles from one face of valve seat 22 and having an inner surface forming an extension of the side walls of aperture 28. The lip faces and extends in a direction toward the inlet of the valve so that inlet pressure is exerted on the lip 56 at all times. Since the lip is thin walled and cylindrical in cases where valve element 26 is cylindrical in cross-section, pressure build up at the inlet side of the valve forces the lip 56 to be pressed firmly against the valve element 26. Inlet pressure of the valve is exploited to increase the effectiveness of the seal between the valve seat and valve element by introducing a new force. Ordinarily valve 10 relies on the energy of spring 34 to maintain the valve element to seat pressure. However, an additional force obtained from inlet pressure of the valve is applied in a direction to press the lip 56 against the valve element.

FIGURE 4 shows a modification wherein valve element 26a is disposed in a crescent-shaped valve seal 28a. The means for increasing the seal pressure consist of lips 56a on each side of the seal. The lips 56a, as lip 56, are made integral with valve seat 22a, but is more readily deformable and flexible than seat 22a. Lips 56a are located between the upper and lower surfaces of valve seat 22a and are composed of an approximately cylindrical member 60 having an inner surface 62 that is slightly concave in cross-section. The lips 56a contact the outer surface of valve element 26a. The seal 28a is integrally joined by means of a thin rib 64 to the main body of the valve seat 22a. This thin rib is readily deformable and deflectable and is located in a plane between the lips 56a. In use of the embodiment of FIGURE 4, both pressure and vacuum will cause the lips to be deflected in a direction to press the surface of the seal 28a more firmly against the outer surface of valve element 26a than would be the case if there were only the valve element 26a operating in an aperture of valve seat 22a. Normally there is a high pressure below seat 22a and a reduced pressure or partial vacuum above the seat. Note that the lips 56a are capable of being deflected in two directions with reference to the longitudinal axis of valve element 26a so that it is effective under both pressure and suction conditions.

From the foregoing, the construction and operation of the device will be readily understood and further explanation is believed to be unnecessary. However, since numerous modifications and changes will readily occur to those skilled in the art, it is not desired to limit the invention to the exact construction shown and described,

What is claimed as new is as follows:

1. A pressure relief valve comprising a valve seat having an aperture therethrough, a valve element round in cross-section and smaller in diameter than said aperture, said element extending through the aperture, a valve seal composed of resilient flexible material located in said aperture and surrounding said element, said seal being annular and crescent shaped in cross-section, the edges of said valve seal resiliently engaging the periphery of said element and adapted to be forced into tight engagement with said element by pressure existing on either side of said seat, the central portion of said seal being connected to said seat by a thin annular flexible rib integral with said seal and projecting radially from the central portion of its outer surface, means sealingly securing said rib to said seat.

2. A device as defined in claim 1 and further including resilient means urging said element axially through said aperture, said resilient means and the fluid pressure adjacent one side of said seat comprising the sole means for operating said valve.

References Cited in the file of this patent

UNITED STATES PATENTS

| | | |
|---|---|---|
| 1,570,568 | Howell | Jan. 19, 1926 |
| 1,919,856 | McGeorge | July 25, 1933 |
| 2,602,592 | Tomoser | July 8, 1952 |
| 2,726,843 | Evans | Dec. 13, 1955 |
| 2,875,977 | Stone | Mar. 3, 1959 |